March 18, 1952  G. GRINDROD  2,589,801
METHOD FOR PRODUCING CACAO-MILK BEVERAGE MATERIAL
Filed Aug. 28, 1947
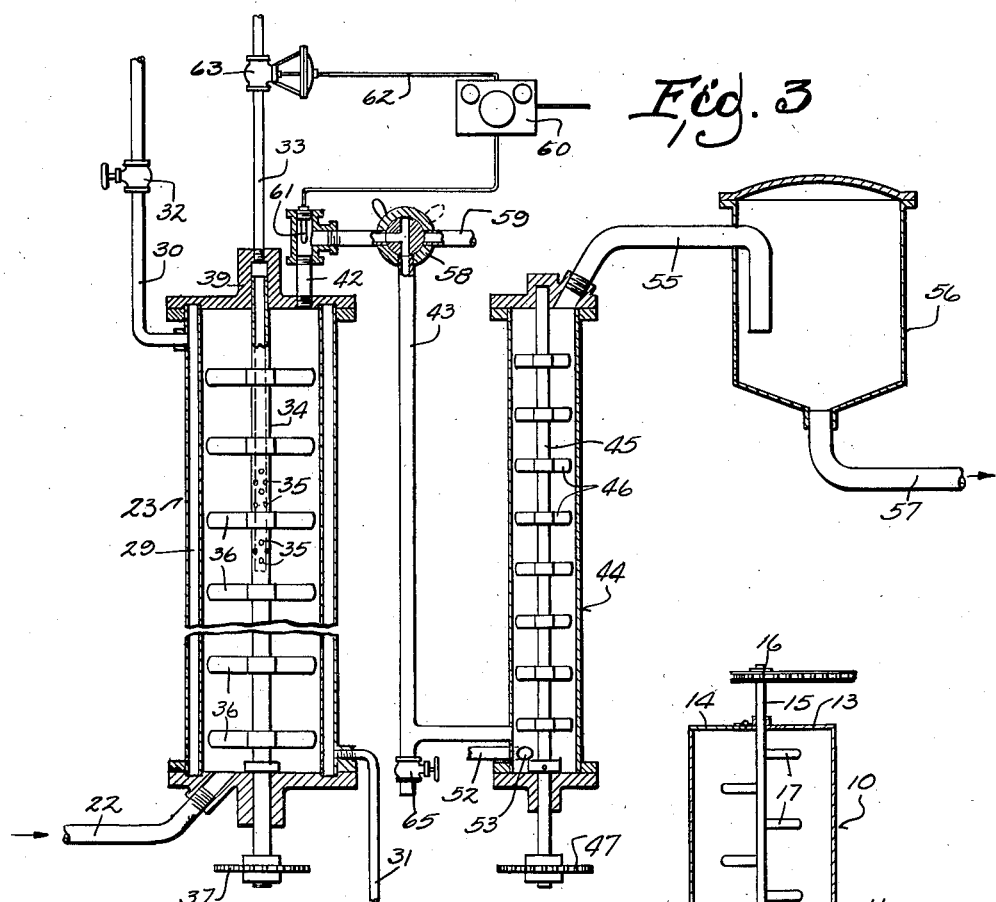
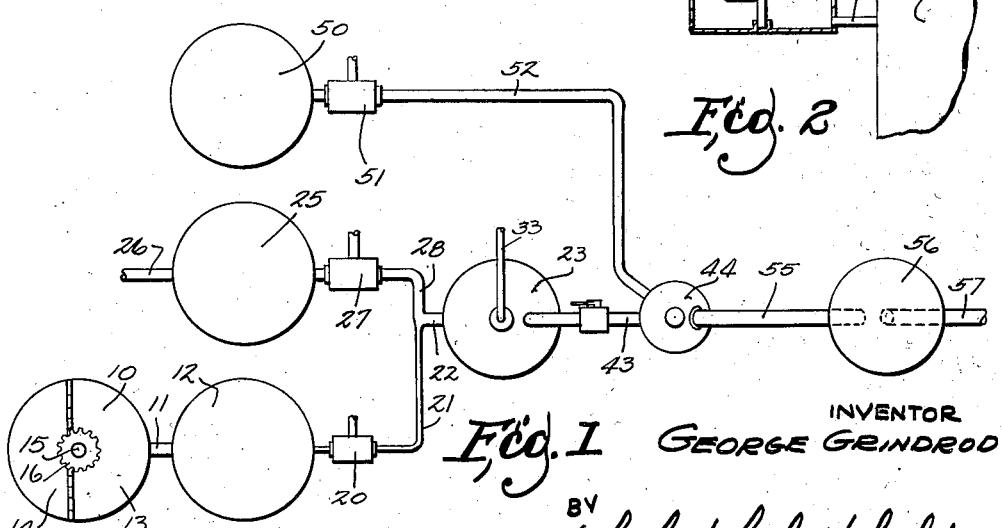
INVENTOR
GEORGE GRINDROD
BY Wheeler, Wheeler & Wheeler
ATTORNEYS Patented Mar. 18, 1952

2,589,801

UNITED STATES PATENT OFFICE 2,589,801

METHOD FOR PRODUCING CACAO-MILK BEVERAGE MATERIAL

George Grindrod, Oconomowoc, Wis.

Application August 28, 1947, Serial No. 770,994

14 Claims. (Cl. 99—25)

This invention relates to improvements in cacao-milk beverage material and to methods and apparatus for producing the same.

The primary object is to provide a colloidal compound as distinguished from simple mixtures of milk solids and cacao solids, together with certain added colloids, whereby a new colloidal compound is obtained which is resistant to coagulation by heat and more stable as to flavor than the simple mixtures of the same ingredients heretofore used.

A further object is to provide means whereby the curdling characteristics of each batch of milk to be used in the manufacture of the improved beverage may be ascertained and compensation made for variations in such characteristics by varying the degree of milk concentration preparatory to the manufacture of the improved beverage in such a manner as to offset increased curdling tendencies by a correspondingly increased concentration, and to offset decreased curdling tendencies with decreased capability of chemical reaction between milk solids and cacao solids by a corresponding reduction in the degree of milk concentration.

A further object is to provide cacao-milk beverage material of improved flavor which can be marketed not only as a fresh beverage or as a canned and sterilized beverage, but also as a concentrate to be diluted by the canner or bottler to beverage consistency. When the liquid is heated and agitated the milk solids will be adsorbed upon the cocoa solids to produce a new type of colloid of about 25 microns in diameter, further coagulating tendencies being simultaneously arrested so that the mixture can be diluted and sterilized without curdling and without flavor deterioration or sedimentation.

When a product of the cacao bean, such as particles of cocoa or chocolate, is introduced into milk, a true solution is not formed, and the particles have a tendency to settle. Non-sterile beverages of this type have heretofore been stabilized against settling tendencies by adding Irish moss, glyceryl mono-stearate and tri-sodium phosphate as described in United States Letters Patent No. 2,211,209, granted to E. C. Johnston, August 13, 1940, for Dairy Product and Stabilizer Therefor.

However, it has been found exceedingly difficult to sterilize such beverages because of deterioration in quality and flavor, and also because the milk tends to curdle when the mixture reaches the elevated temperature required for commercial sterilization. As heretofore practiced, this problem of curdling has been aggravated by reason of its unpredictability, and unsuccessful attempts have been made to overcome the curdling tendencies by dilution. The curdling tendencies of successive batches, prepared in precisely the same manner and apparently under the same conditions, have been found to vary to a wide and heretofore uncontrolled extent.

These difficulties have heretofore been sufficient to prevent the commercial development of canned chocolate and cocoa beverages as made by the retort process of sterilization, and while such beverages have been made successfully by special sterilizing processes, followed by aseptic canning, these special processes have been expensive and difficult to apply, and commercial success in the manufacture of low cost beverages of this type has not heretofore been attained.

My improved method is based upon the finding of a set of conditions under which the colloidal structure of a cocoa or chocolate milk mixture may be changed and the solids dispersed and recombined in a new colloidal form. I have found that with a correct degree of concentration of the initial milk ingredient, the mixture may be processed through the first or thickening stage of incipient coagulation and then, instead of curdling, it may be caused to revert into a new form of colloidal dispersion, in which the chocolate or cocoa material and the milk solids become united to form a new type of particle having a diameter of about 25 microns and capable of being maintained in permanent suspension. The new suspension is practically stable against further coagulation and is stable against flavor change to such an extent that it has great value as a commercial beverage.

The new suspension as initially made is a chocolate concentrate which may be gelatinized when cool and is characterized by its novel colloidal structure which becomes specifically evident when the concentrate is diluted and tested for heat coagulability, or is examined microscopically.

The fact that my product is not coagulable by heat is of great importance commercially because, for the first time, it is possible to provide a stable chocolate beverage which will remain smooth and uncoagulable when sterilized at high temperatures in closed containers such as tin cans.

In order to obtain this new product, it is necessary to achieve accurate control of the concentration of the milk to effect colloidal coagulation without grain or curdle, the concentration being maintained at the minimum which avoids curdling during the sterilization step.

But as to each batch of milk to be processed, the degree of milk concentration required to obtain the best results cannot be specified until the quality of the milk has been tested. Its response to the treatment may vary from day to day, season to season, and year to year, and the degree of its concentration must be varied accordingly in order to obtain the new colloidal dispersion and recombination to the maximum possible extent.

Therefore, before proceeding to manufacture any given batch of cocoa-milk beverage on a commercial scale, I test the quality of the milk in that batch by making a small quantity of the beverage on a laboratory scale, and in so doing I proceed as follows:

To 1000 gm. of fresh milk, taken from the batch, I add 640 gm. of sweetened condensed milk and 80 gm. of cocoa powder, modified by the addition of a stabilizing agent, such as carageen, equal to 1 or 2% of the weight of the cocoa.

The above ingredients are mixed mechanically to form a smooth syrup, which is then agitated and heated by application of surface heat to about 180° F., after which it is more rapidly heated by injecting steam in a multiple group of fine jets through a submerged steam nozzle, the steam being admitted under considerable pressure and with sufficient rapidity to heat the mixture to or above 200° F. in one or two minutes. At some point near boiling, the mixture will suddenly thicken, indicating an initiation of the first stage of coagulation, and after about one to five minutes of further steam jet heating, the thickening reaction should be complete, and the casein of the milk enters into colloidal combination with both the soluble and insoluble cocoa solids. I then promptly add sufficient water at or nearly at a boiling temperature to dilute the thickened mixture to beverage consistency.

In the above described test the mixture will contain about 38% of total solids before steam jet heating and about 36% of total solids after steam jet heating and before dilution. If the milk concentration was greater than that required to obtain the desired reaction the beverage will have a coarse, grainy appearance and the test must be repeated, using a smaller quantity of sweetened condensed milk and thus reducing the percentage of total solids in the mixture. In this manner the degree of concentration may be reduced step by step in successive tests until a pilot beverage is obtained which has the appearance of a fresh cocoa milk beverage and the desired flavor of the new suspension. Thereupon it is canned and sterilized in the can with rotation substantially in the manner in which evaporated milk is sterilized, viz. by rotation of the cans for about 15 minutes at a steam temperature of 240° F. or higher. The product is then examined, and if it has curdled to any extent, such curdling will be evidence that the milk concentration was insufficient. In that case one or more additional tests must be made using a slightly greater proportion of sweetened condensed milk, until the sterilized product does not curdle and the beverage has the characteristic appearance and flavor of the new suspension. It is desirable to also have on hand for the pilot tests a supply of unsweetened concentrated milk so that the concentration may be further adjusted without change in the proportion of sugar. But for the formulas generally used, a close approximation to the desired degree of concentration and sugar content may be obtained by mixing fresh milk with sweetened condensed milk.

In other words, the concentration of the milk must be varied in successive tests until the desired reaction is obtained and the precise formula to be followed in processing that particular batch of milk has been ascertained.

The object of using a percentage of sweetened condensed milk in making these tests is to save time in obtaining a mixture having a known degree of milk concentration. Sweetened condensed milk has a standard degree of concentration, and it may be kept on hand and used in varying quantities while making such tests.

The preliminary tests are aptly termed pilot tests, and after determining the required formula for any given batch of fresh milk, and while proceeding with the manufacture of the beverage on a commercial scale, it is possible to either concentrate the fresh milk to the desired degree or to continue to mix it with the predetermined proportion of sweetened condensed milk in order to obtain the proper milk concentrate.

To facilitate producing my improved beverage in commercial quantities, I have designed certain special apparatus which I prefer to use, and which will now be described.

In the drawings:

Fig. 1 is a plan view of apparatus for the practice of this invention.

Fig. 2 is a detail view in vertical section through a portion of the apparatus shown in Fig. 1.

Fig. 3 is an enlarged detail view in vertical section through another portion of the apparatus shown in Fig. 1.

In the commercial manufacture of my improved beverage, I preferably employ a mixing chamber 10 in which to prepare successive mixtures of sweetened milk concentrate (or sweetened condensed milk) and cocoa or chocolate, modified by the addition of carageen as aforesaid, whereby the mixture may be delivered through a pipe 11 into a tank 12 from which metered quantities may be continuously withdrawn. The mixing chamber 10 may be provided with a cover 13, having a hinged lid 14 through which the ingredients may be delivered to the chamber. A shaft 15 extends axially through the fixed portion of the cover and is provided with an exterior sprocket wheel 16, whereby it may be driven from any suitable source of power, not shown. Within the chamber 10 it is provided with mixing paddles 17, and each batch, when mixed, may be delivered through the pipe 11 into the tank 12, from which the mixture is being continuously withdrawn by a metering pump 20 and delivered through pipes 21 and 22 to an upright heating cylinder 23. The chamber 10 may be of any desired size, and the tank 12 should be of sufficient size to maintain a sufficient supply to the metering pump 20 while another mixture is being prepared in the chamber 10. For each day's run in the manufacture of a commercial beverage a batch of fresh milk will have been accumulated equal to the day's supply, and this batch of milk will have been tested by one or more of the above described pilot tests to ascertain its curdling characteristic and the quantity of the liquid from chamber 10 to be mixed therewith in order to obtain the desired degree of concentration indicated by the pilot tests to be necessary for the best results. From this batch of fresh milk a supply may be continuously delivered into a tank 25 through a pipe 26, or at least a supply may be thus maintained in tank 25 to permit a continuous withdrawal from that tank by a metering pump 27 while the metering pump 20 is in operation. The outlet of the metering pump 27 is connected to the pipe 22 by a pipe 28 whereby the fresh milk may be continuously added to the concentrate which is being delivered through said pipe 22 for the pump 20. The metering pumps 20 and 27 may be presumed to be of the ordinary positive flow sanitary milk pump type, made of stainless steel or other material non-injurious to milk products. They are equipped with variable speed drives so that each may be set to deliver the concentrate from tank 12 and the fresh milk from tank 25 in substantially the proportions determined by the pilot tests to be desirable.

The heating cylinder 23 into which these liquids are pumped is disposed in an upright position (Fig. 2) and is jacketed to provide an annular cavity 29, to the upper end of which a steam supply pipe 30 is connected, and to the lower end of which a drain or return pipe 31 connects. A manually operable valve 32 controls steam delivery through the pipe 30.

Dry steam is also injected into an upper portion of the cylinder 23 through a pipe 33 and an axially disposed hollow shaft 34 provided with nozzles or ports 35 for injection of steam directly into the liquid after it has been prewarmed in the lower portion of the cylinder. The shaft 34 has radial mixing paddles 36, and it has a solid lower end which extends through the bottom of the cylinder and is driven by an exterior sprocket wheel 37 connected with a suitable source of power. The open upper end of this shaft is socketed in the cap 39, and the steam supply pipe 33 communicates with this socket, whereby a sufficient volume of steam at a temperature of about 240° F. (for example) may be delivered through the ports 35 to raise the temperature of the liquid in the cylinder from about 180° F. to about 200° F. in approximately one minute. If the temperature of the liquid has not already reached the boiling point, the cylinder may have sufficient height above the ports 35 to allow the temperature to be raised to or nearly to the boiling point before reaching the top of the cylinder.

The internal diameter of the cylinder 23 is so proportioned to the rate of liquid flow therethrough that the liquid mixture may be gradually prewarmed to about 180° F. without the aid of steam injection. Thereafter, the added heat of the injected steam will cause a more rapid temperature rise to 200° F. or to approximately the boiling point in about one minute. The liquid then passes above the steam injection nozzles but continues to absorb external heat more gradually for about one minute more, or until it reaches the top of the cylinder, at which time, if the milk ingredient has been properly concentrated, the milk and cacao solids will have been redispersed and chemically recombined in the form of a new colloid, with the milk solids adsorbed upon the cacao solids.

The product may then be chilled, refrigerated and sold in concentrated form as a gelatinized product to be converted into a beverage by the canner or bottler as hereinafter explained, but if it is to be immediately diluted, canned and sterilized as a beverage, it will be delivered through pipes 42 and 43 into the bottom portion of a diluting chamber 44 which also has an axially disposed shaft 45 provided with mixing paddles 46, and having its lower end extended through the bottom of the chamber and provided with a driving sprocket 47. Hot water from a supply tank 50 is also being delivered into the bottom portion of this chamber 44 by a metering pump 51 having an outlet pipe 52 communicating with the chamber 44 through a port 53. The hot water and cocoa-milk mixture are thoroughly mixed, and the mixture diluted to beverage consistency preparatory to delivery through a pipe 55 into a reservoir 56 provided with an outlet pipe 57 leading to can filling, sealing and sterilizing equipment of ordinary type employed for sterilizing material in sealed cans, and therefore not necessary to illustrate or describe. The sterile product may be kept in storage for many months without deterioration or objectionable flavor change.

An ordinary thermoregulator 60 has its bulb 61 exposed to the liquid to regulate delivery of air through pipe 62 to a diaphragm valve 63 controlling steam delivery through pipe 33.

The pipe 43 is provided with a two-way valve at 58 whereby if the concentrate is to be commercially marketed for dilution by the retailer or user, it may be delivered through a branch pipe 59 to a vacuum chamber (not shown) to be immediately chilled, further concentrated and then cooled by refrigeration until it jells and becomes stable. In this form it will keep under refrigeration for at least two weeks to permit marketing by the usual methods for bulk dairy products, and it may then be diluted by the retailer or by the user or by adding sufficient hot water to bring it to a beverage consistency. In this form, it will be found superior in flavor to ordinary cocoa milk beverages.

In some larger apparatus, the zone of steam jet heating to produce the coagulation is a separate unit of apparatus, instead of being part of the preheater. In either case, the coagulated and redispersed concentrate emerges into tank 56 at, or near, the boiling point.

After dilution with hot water by the bottler if it is again immediately cooled, it may be bottled and delivered in the same manner as ordinary freshly mixed cocoa or chocolate milk beverages are delivered. The soluble colored chocolate substances unite with the aggregate, and the color can be removed from solution by filtration through ordinary filter paper. The serum filters clear without chocolate or milky color. The dispersion is not mechanical but is more correctly described as a rearrangement of existing colloids into new combinations of particle size somewhat greater than that of the true colloids. In other words, the particles of 25 micron size are in the upper range of the size called colloidal. They are not large enough to drift to separation by gravity under the described conditions.

In some particles the cacao-ingredient can be identified microscopically. Some of it is always present as mechanically ground fragments serving as centers of the clot-like particles. The cacao ingredient is ground very fine for the purpose of making these beverages.

I preferably provide the pipe 43 with a manually controlled outlet valve 65 through which small samples may be delivered from time to time and inspected or examined microscopically to ascertain its condition and then make any changes in the adjustment of the thermoregulator 60, which may be found necessary to vary the time and rate of heating, to obtain the best possible reaction and ensure that the temperature of the product is neither unnecessarily high nor unduly prolonged.

In the commercial manufacture of my improved beverage I have found it desirable to keep on hand a concentrate of sweetened skim milk of a density of about 40 parts sugar, 30 parts skim milk solids, 30 parts water and four parts of powdered cocoa, modified by carageen to the extent of approximately 2% of the weight of the cocoa.

The above described pilot tests require no variation in this concentrate, which may therefore be renewed and kept on hand at all times during the commercial manufacture of the beverage. The variations called for by the pilot tests are obtained by merely varying the amount of fresh milk to be added. For example, on one occasion, I found that the best results could be obtained by mixing with such a concentrate a little more than twice its weight of fresh milk, whereas on another occasion, during which the cattle were being differently fed, I found by the pilot tests that to obtain the best results the concentrate should be mixed with only about 1⅓ times its weight of fresh milk.

These statements are also applicable to the suggested modification of the process by an equivalent mixing of a sweetened concentration of the fresh milk with modified cocoa or chocolate preparatory to delivery into tank 12 and pump 27, thereby dispensing with tank 25 and increasing the capacity of the pump 20 to deliver all of the milk ingredient to tank 23.

The shafts 34 and 35 are revolved at a considerable speed, preferably at about 1000 R. P. M. This is done to ensure uniformity of reaction in all portions of the mixture.

To supply an average capacity production line of canning equipment requires about 100 lbs. of beverage per minute, and to make this amount, the metering pumps would be adjusted to deliver liquid at the following rate:

The cocoa-milk concentrate (pump 20), 22½ lbs. per minute.

The fresh milk (pump 27), 30½ lbs. per minute.

The hot water (pump 51), about 45 to 47 lbs. per minute.

In adjusting the pump 51, account may be taken of the quantity of steam, if any, condensed in the prewarming of the concentrate, as well as of the steam injected into the liquid in cylinder 23 through the ports 35. The degree of dilution is not critical, although it may affect the palatability of the beverage to some extent. My reason for not injecting steam to prewarm the concentrate to 180° F. is to avoid changing the degree of concentration as determined by the pilot tests.

The product obtained by the above described process has the following distinct characteristics:

1. It may be suction filtered through filter paper, and the filtrate will be opalescent in color instead of milky. The milk solids and the chocolate matter (if chocolate is used in place of cocoa), are combined in particles which do not pass through filter paper, whereas simple mixtures of milk and cocoa give a milky and colored filtrate. The recombined colloid of the new product is in particle size of about 25 microns, which is larger than the particle size of casein in its natural state, and the soluble coloring matter of the cholocate is combined with the milk constituents.

2. If the beverage is heated to near boiling and is then allowed to stand quietly, it still retains its redispersed cocoa and casein in suspension. It is thus distinguished from beverages stabilized by hydration, or by hydrating agents such as agar. An ordinary cocoa beverage stabilized by hydration loses its permanent suspension of cocoa when heated, although it may recover a considerable degree of stability after it has been cooled and agitated.

3. The new beverage is not objectionably changed in flavor by its sterilization. It does not have the flavor usually developed in milk by such a degree of heating. It is much less sensitive to heat than the beverages heretofore made from the same ingredients.

4. If the above described improved beverage is further diluted with hot water and allowed to stand undisturbed it does not undergo sedimentation, although the drift characteristics of colloidal solutions may be detected in either the diluted or undiluted stage. This distinguishes it from beverages stabilized by thickening, for such beverages become unstable if diluted with hot water.

5. If the beverage is made with skim milk it has substantially the same resistance to gravitational separation as one made with milk containing fat. It is not necessary to lighten the specific gravity of the total solids in order to prevent gravitational separation, although skim milk solids and cocoa are necessarily much heavier than the milk serum.

6. The improved beverage, after canning and sterilizing, remains substantially unchanged under any ordinary conditions of commercial transportation and storage. Examination of samples which have stood undisturbed for various lengths of time up to three months shows that the particles undergo colloidal drift to a status of equilibrium which they generally reach within a month, with no further change thereafter. The drift follows the law of Perrin for distribution of colloidal particles, and the status of equilibrium is reached before the drift becomes readily visible, although it may be detected by examination of thin layers.

Successive examinations have disclosed that there is a definite tendency for the particle size to reach a limit and cease growth while the recombined solids are still of colloidal size. Probably both the speed of heating and the presence of a protective colloid contribute to this tendency to obtain a dispersion and recombination which is new to the art.

As above stated in describing the pilot tests, it is possible to concentrate all of the fresh milk to the degree found by the pilot tests to be proper and mix it directly with sugar and with the modified cocoa or cholocate in the chamber 10. In that event, the tank 25 and pump 27 may be dispensed with and all of the mixture delivered through tank 12 and pump 20 directly to the cylinder 23.

It is also possible to first mix the concentrate with the fresh milk (full cream or skim), and then add the modified cocoa to this mixture preparatory to heating it to the thickening stage as above described, but I prefer to first mix the concentrate with the modified cocoa as above described because that does not require immediate heat treatment to prevent spoilage. Therefore a large quantity may be separately mixed in chamber 10 and definite quantities withdrawn as needed for mixture with the successive tested batches of fresh milk delivered to tank 25 and withdrawn in proper proportions by the metering pump 27.

The cocoa may be mixed mechanically into the sweet milk concentrate at any reasonable time prior to use. The mixture has the consistency of a heavy syrup and may be metered by a pump. By employing three metering pumps, one for delivering concentrated skim milk carrying the cocoa and the sugar, another for delivering additional fresh milk, and a third one for delivering the hot water for dilution, the proportions predetermined by the pilot tests can be mechanically maintained with the accuracy needed for the attainment of the best results.

In the commercial manufacture of my improved beverage, as well as when making the pilot tests, a preliminary concentration of the milk ingredient of the mixture and the use of a protective colloid in the cacao ingredient are necessary since no equivalent stabilizing reaction can be obtained by merely mixing the beverage in the diluted form and then passing it through the cylinder 23 and heating it as above described. The degree of concentration, and the rate and extent of heating preparatory to dilution, are presumably interrelated. A higher concentration of the liquid in tank 12 tends to cause incipient coagulation at a lower temperature in tank 23, and too much concentration in tank 12 makes it difficult to stop the reaction at the exact point when thickening is complete and before the final stage of coagulation has commenced.

Also, while carageen is preferably used to modify the cacao ingredient for stabilizing purposes, any of the well known edible stabilizers may be used for this purpose. But while modifications of the herein described method and apparatus may be employed, the best results require the making of pilot tests for each batch of fresh milk collected, and use of the degree of milk concentration indicated by such pilot tests to be most favorable to the desired reaction in cylinder 23.

In this specification and in the appended claims the term "fresh milk" is to be interpreted generically as applicable to skim milk as well as milk containing cream.

I claim:

1. Those steps in the herein described process of making cacao-milk beverage material, which consists in mixing about 4% by weight of finely divided cacao powder with a batch of sweetened milk concentrate to obtain a mixture having about 38% total solids, agitating the mixture at coagulating temperatures to obtain general adsorption of the milk solids on the cacao solids, and diluting, canning and sterilizing the resultant product, the concentration of the milk concentrate being such that the adsorption occurs without granulation and sterilization occurs without curdling.

2. That step in a process of producing cacao-milk beverages consisting in concentrating the milk, adding sugar and powdered cacao, prewarming the mixture to about 180° F., agitating the mixture and more rapidly raising its temperature through the stage of incipient coagulation until the casein of the milk enters into colloidal combination with both soluble and insoluble cacao solids.

3. The process of making cacao-milk beverage material, which consists in preparing a finely divided cacao powder, modified by a small percentage of an edible protective colloid, mixing it with a sweetened milk concentrate of a density to combine milk solids fully with the cacao particles during incipient coagulation, prewarming the mixture to about 180° F., mechanically agitating it and injecting steam to raise its temperature rapidly through the thickening stage of incipient coagulation, whereby to redisperse and recombine the milk solids with the cacao solids and thereby stabilize the product against curdling tendencies and sedimentation.

4. The process of making cacao-milk beverage material, which consists in preparing a finely divided cacao powder, modified by a small percentage of an edible protective colloid, mixing it with a sweetened milk concentrate of such density as to combine milk solids fully with the cacao particles during incipient coagulation, prewarming the mixture to about 180° F., mechanically agitating it and injecting steam to raise its temperature rapidly through the thickening stage of incipient coagulation, whereby to redisperse and recombine the milk solids with the cacao solids and thereby stabilize the product against curdling tendencies and sedimentation, and then diluting the mixture with hot water to beverage consistency.

5. The process of making cacao-milk beverage material, which consists in preparing a finely divided cacao powder, modified by a small percentage of an edible protective colloid, mixing it with a sweetened milk concentrate of a density to combine milk solids fully with the cacao particles during incipient coagulation, prewarming the mixture to about 180° F., mechanically agitating it and injecting steam to raise its temperature rapidly through the thickening stage of incipient coagulation, whereby to redisperse and recombine the milk solids with the cacao solids and thereby stabilize the product against curdling tendencies and sedimentation, and then diluting the mixture with hot water to beverage consistency, canning, and sterilizing it in the can.

6. The process of making cacao-milk beverages which consists in preparing a concentrate of sweetened skim milk and a powdered product of cacao modified by a small quantity of an edible protective colloid, such as carageen, applying external heat for about one minute to raise the temperature of the liquid to about 180° F., then injecting steam and applying external heat to more rapidly raise the temperature of the liquid until incipient coagulation is substantially complete, then promptly diluting the liquid to beverage consistency by adding hot water.

7. The process of making cacao-milk beverages which consists in preparing a concentrate of sweetened milk and a powered product of cacao modified by a small quantity of an edible protective colloid such as carageen, prewarming the material to about 180° F. and then injecting steam directly into the material to additionally raise the temperature nearly to the boiling point to complete incipient coagulation, then promptly diluting the liquid to beverage consistency by adding hot water, and promptly canning and subjecting the liquid in the can to a sterilizing temperature.

8. The process of making cacao-milk beverages, which consists in preparing a concentrate of sweetened condensed skim milk and a powdered product of cacao, modified by a small quantity of carageen, adding fresh fluid milk, applying heat to quickly raise the temperature of the mixture nearly to the boiling point, diluting the mixture with hot water as soon as incipient coagulation becomes complete and promptly canning and sterilizing the product.

9. The process of making cacao-milk beverages which consists in preparing a concentrate of sweetened skim milk of a density of about 40 parts sugar, 30 parts skim milk solids and 30 parts water, adding thereto about 4 parts of powdered product of the cacao-bean modified by addition of a small percentage of carageen, then mixing the concentrate with a little more than 1⅓ times its weight of unconcentrated milk, raising the temperature of the mixture to a degree promotive of incipient coagulation, steam jet heating it from a temperature of about 180° F. nearly to the boiling point, and then diluting it with hot water to beverage consistency, canning and sterilizing the beverage in the can.

10. A method of producing a cacao-milk beverage product, such method comprising mixing a pre-concentrated milk with a finely divided cacao powder, abruptly raising the temperature of the mixture to approximately 200° F., diluting, canning and sterilizing the resulting product.

11. A method of preparing a cacao-milk beverage product, which method comprises mixing cacao powder in finely divided form in predetermined proportion with milk of predetermined concentration, and agitating the mixture of the concentrated milk and powder while abruptly raising the temperature of the mixture to approximately 200° F., thereby redispersing the milk and cacao solids and chemically re-combining them in the form of a new colloid in a concentrated suspension wherein the milk solids are adsorbed upon cacao solids, the degree of concentration of the milk being such that the resulting product is smooth and free from grain and uncurdled.

12. The method of claim 11 in combination with the further step of diluting the concentrated colloidal suspension with water, packaging the product, and sterilizing the packaged product.

13. A method of making a cacao-milk beverage material which comprises the steps of partially concentrating a milk product and rapidly heating and agitating the partially concentrated milk product in the presence of finely divided cacao solids to a temperature of approximately 200° F., to adsorb the cacao solids upon milk solids in permanently suspended particles having an overall diameter of about 25 microns, and arresting the concentration as soon as such adsorption occurs, and prior to curdling.

14. The method of claim 13 followed by the further step of diluting the concentrate.

GEORGE GRINDROD.

REFERENCES CITED

The following references are of record in the file of this patent:

UNITED STATES PATENTS

| Number | Name | Date |
|---|---|---|
| 893,343 | Meyer | July 14, 1908 |
| 1,564,262 | Mellott | Dec. 8, 1925 |
| 1,710,508 | North | Apr. 23, 1929 |
| 1,849,030 | Zern et al. | Mar. 8, 1932 |
| 1,993,511 | Grindrod | Mar. 5, 1935 |
| 2,101,374 | Tucker | Dec. 7, 1937 |
| 2,106,089 | Fick | Jan. 18, 1938 |
| 2,117,682 | Sanna | May 17, 1938 |

FOREIGN PATENTS

| Number | Country | Date |
|---|---|---|
| 10,777 | Great Britain | of 1909 |
| 439,572 | Great Britain | of 1935 |

OTHER REFERENCES

Cocoa-Milk Beverages, Larner, Food Industries, July 1932, pages 231 and 232.